US012810602B2

(12) United States Patent
Bewley

(10) Patent No.: US 12,810,602 B2
(45) Date of Patent: Nov. 24, 2026

(54) EFFICIENT TEMPORAL NETWORKS FOR STREAMING DATA

(71) Applicant: Google LLC, Mountain View, CA (US)

(72) Inventor: Alex Joseph Bewley, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 174 days.

(21) Appl. No.: 18/642,991

(22) Filed: Apr. 23, 2024

(65) Prior Publication Data

US 2024/0362906 A1 Oct. 31, 2024

Related U.S. Application Data

(60) Provisional application No. 63/498,123, filed on Apr. 25, 2023.

(51) Int. Cl.
*G06V 10/82* (2022.01)

(52) U.S. Cl.
CPC .................................... *G06V 10/82* (2022.01)

(58) Field of Classification Search
CPC ...................................................... G06V 10/82
USPC .......................................................... 382/155
See application file for complete search history.

(56) References Cited

PUBLICATIONS

Li, Mingjie, et al. "Generalizable memory-driven transformer for multivariate long sequence time-series forecasting." arXiv preprint arXiv: 220707827 (2022). (Year: 2022).*

Bhatt, Ankit, Weerakorn Ongsakul, and Jai Govind Singh. "Sliding window approach with first-order differencing for very short-term solar irradiance forecasting using deep learning models." Sustainable Energy Technologies and Assessments 50 (2022): 101864. ( Year: 2022).*

Jaén-Vargas, Milagros, et al. "Effects of sliding window variation in the performance of acceleration-based human activity recognition using deep learning models." PeerJ Computer Science 8 (2022): e1052. (Year: 2022).*

Suresh, Vishnu, et al. "Forecasting solar PV output using convolutional neural networks with a sliding window algorithm." Energies 13.3 (2020): 723. (Year: 2020).*

Liu et al., "SSD: Single Shot MultiBox Detector", Dec. 29, 2016, 17 pages.

(Continued)

*Primary Examiner* — Jonathan S Lee

(74) *Attorney, Agent, or Firm* — DORITY & MANNING, P.A.

(57) ABSTRACT

Improved methods for executing multi-layer machine learning model architectures in the context of ordered inputs sequences that experience progressive updates are provided that exhibit increased decreased inference compute cost and/or decreased inference time latency. These improved models include storing some or all of the intermediate outputs of the model's units for later re-use, e.g., once one or more novel inputs of an input sequence have been obtained. Storing such intermediate outputs allows the computational effort used to generate them (e.g., by applying the relevant model input(s) to the relevant unit(s) and/or layer(s) of the model) to be avoided in subsequent execution of the model. Instead, only those model units whose outputs would differ from one model execution to the next are re-computed in order to generate an updated model output, thereby significantly reducing the computational cost and/or time to execute the model in light of the updated input(s).

20 Claims, 5 Drawing Sheets

(56) References Cited

PUBLICATIONS

Van den Oord et al., “WaveNet: A Generative Model for Raw Audio”, Sep. 19, 2016, 15 pages.
Zhou et al., “Objects as Points”, Apr. 25, 2019, 12 pages.
Zhou et al., “Tracking Objects as Points”, Aug. 21, 2020, 22 pages.
Held et al., “Learning to Track at 100 FPS with Deep Regression Networks”, 17 pages.
Khandelwal et al., “Efficient Real-Time Inference in Temporal Convolution Networks”, 7 pages.
Beltagy et al., “Longformer: The Long-Document Transformer”, arXiv:2004.05150v2, Dec 2, 2020, 17 pages.
Paine et al., “Fast Wavenet Generation Algorithm”, arXiv:1611.09482v1, Nov. 29, 2016, 6 pages.
Shazeer, “Fast Transformer Decoding: One Write-Head is All You Need”, arXiv:1911.02150v1, Nov. 6, 2019.

* cited by examiner

EFFICIENT TEMPORAL NETWORKS FOR STREAMING DATA

CROSS-REFERENCE TO RELATED APPLICATION

The present application claims priority from U.S. provisional patent application No. 63/498,123, filed on Apr. 25, 2023, the contents of which are incorporated by reference.

BACKGROUND

Artificial neural networks, convolutional neural networks, transformers, deep learning models, and/or other machine learning models can be used to classify inputs, to filter or otherwise modify inputs, to project inputs into a semantically relevant or otherwise useful embedding space, to classify images, text, or other inputs, to segment images, to generate textual responses to input text, to assess sentiment in input text, or to provide other beneficial outputs from applied inputs. However, the execution of such models can be expensive with respect to the cost in memory and/or computational cycles or other computational resources, power, time, time, or other factors. This can be especially true for multi-layer networks that operate on ordered sequences of inputs (e.g., time series of inputs), where a model having a longer 'memory' with respect to the input may require a corresponding increase in the number of units and/or layers of the model.

SUMMARY

In a first aspect, a method is provided that includes: (i) executing a machine learning model to generate a first output from a first ordered set of inputs, wherein the machine learning model comprises a plurality of layers organized in order such that (a) units of a first layer of the plurality of layers receive as inputs respective inputs of the first ordered set of inputs and provide respective intermediate outputs to a second layer of the plurality of layers, (b) units of a middle layer of the plurality of layers receive as inputs intermediate outputs of a preceding layer of the plurality of layers and provide respective intermediate outputs to a subsequent layer of the plurality of layers, and (c) a final layer of the plurality of layers receives as inputs intermediate outputs of a preceding layer of the plurality of layers and provides as an output the output of the machine learning model, wherein executing the machine learning model to generate the first output from the first ordered set of inputs comprises storing at least one intermediate output of the first layer and at least one intermediate output of the middle layer; (ii) obtaining a second ordered set of inputs by shifting the first ordered set of inputs such that a plurality of former inputs of the second ordered set of inputs are a plurality of latter inputs of the first ordered set of inputs, wherein a latter-most input of the second ordered set of inputs is a novel input; and (iii) executing the machine learning model to generate a second output from the second ordered set of inputs, wherein executing the machine learning model to generate the second output from the second ordered set of inputs comprises (a) re-using at least one of the stored intermediate outputs of the first layer instead of re-computing the at least one of the stored intermediate outputs of the first layer and (b) re-using at least one of the stored intermediate outputs of the middle layer instead of re-computing the at least one of the stored intermediate outputs of the middle layer.

In another aspect, a non-transitory computer readable medium is provided having stored thereon program instructions executable by at least one processor to cause the at least one processor to perform the above method.

In another aspect a system is provided that includes: (i) at least one processor; and (ii) a non-transitory computer-readable medium, having stored therein instructions executable by the at least one processor to cause the system to perform the above method.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1A:
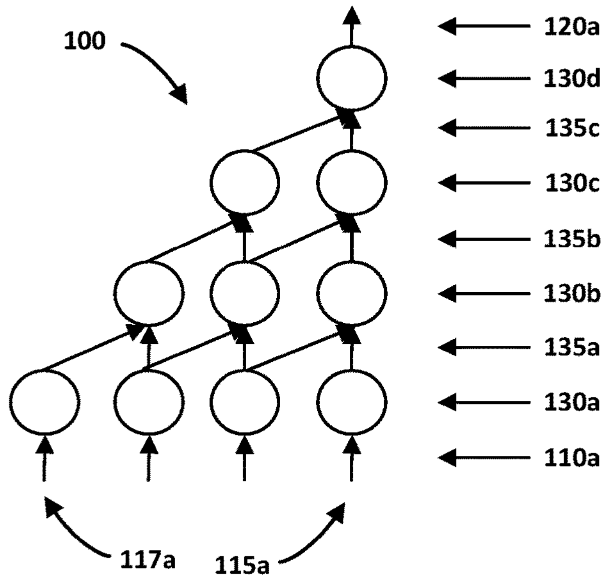
FIG. 1A illustrates aspects of a multi-layer machine learning model, according to an example embodiment.

Examples of methods and systems are described herein. It should be understood that the words "exemplary," "example," and "illustrative," are used herein to mean "serving as an example, instance, or illustration." Any embodiment or feature described herein as "exemplary," "example," or "illustrative," is not necessarily to be construed as preferred or advantageous over other embodiments or features. Further, the exemplary embodiments described herein are not meant to be limiting. It will be readily understood that certain aspects of the disclosed systems and methods can be arranged and combined in a wide variety of different configurations.

I. OVERVIEW

A variety of machine learning model types and associated execution/inference methods have been developed in order to generate outputs from inputs in a variety of applications. Such models have been developed to be able to accurately predict class values, segmentation maps, object location/trajectory/identity, language translations, sentiment and/or semantic content of text, or other outputs from text, token sequences, images, feature vectors, or other inputs.

In many applications, the model is a multi-layer model, with the units of the model being organized into layers. The outputs of the units of one layer are applied as inputs to the unit(s) of the next layer (except for the final layer, whose output is the overall output of the model). Such a multi-layer model allows the model to represent structure and information within the input at multiple different levels, and potentially to perform such computation in a local manner (by applying different portions of an input and/or of an intermediate-level representation thereof to respective different units of the model that are arranged in a one-, two-, or higher-dimensional structure). For example, the input of a model could include an ordered sequence of text, images (e.g., frames of video output from a camera in real-time), scalars (e.g., representing samples of an audio signal), text or other symbols or symbol sequences (e.g., base pairs of a gene sequence), vectors (e.g., representing haptic input detected by a manipulator or other element(s) of a robot), or some other ordered sequence of inputs. In such examples, each element of the input could be applied to a respective unit in an input layer of the model, with the intermediate outputs of the input layer being combined in a local manner (e.g., with each pair of neighboring units providing their intermediate outputs to a respective unit of a second layer of the model, etc.) to process the input through the model to generate an output.

In examples wherein the model input is an ordered sequence of inputs (e.g., a series of camera images, a sequence of gene-sequenced base-pairs, a sequence of audio samples, a sequence of text or other tokens representing language), the model may be executed a plurality of times to generate a plurality of outputs 'along' the input. For example, where the input is a series of camera images being generated over time (e.g., in order to locate and predict the motion of a target object), the model could be run over and over again as new image frames are received (e.g., with the input changing from one execution to the next by shifting the input, discarding the oldest element thereof, and adding a novel element thereto), in order to generate updated estimates of the model output (e.g., updated estimates of the location, trajectory, etc. of a ball or other target that is being imaged by the camera).

However, such operation can be computationally expensive, especially in examples wherein the machine learning model and/or the elements of the input are large. This can make it difficult to perform the repeated model updates/execution within a specified latency, computational power budget, etc. (e.g., using only the limited local computational resources of a robot, smartphone, or other computationally limited system). For example, to use the output of the model to control the operation of a robot (e.g., to catch or otherwise interact with a moving object), it may be necessary to repeatedly execute the model, using the continuously updated inputs, within a specified period of time so that latency of the output is short enough to be of use in controlling the robot.

Embodiments described herein provide improvements to the computational cost, latency, speed, and other aspects of computation of updated model outputs in such an "updated input" context, where a portion (e.g., all but one element) of the input is an ordered sequence that is the same but shifted from one execution to the next. These benefits are achieved by storing and re-using intermediate outputs (e.g., outputs from units of the model other than the final output unit) for subsequent model executions, rather than re-computing such intermediate outputs with each execution. The computational effort saved in this manner can significantly reduce the computational resources (e.g., number of processors or processor cores) needed to execute a model within a specified period of time and/or can significantly reduce the latency of executing the model using a specified finite amount of computational resources.

These embodiments are beneficial for model structures wherein each unit within a particular layer of a machine learning model is the same as applied across the elements of an ordered sequence of inputs (or across an ordered sequence of higher-layer intermediate outputs). Thus, as the inputs of the ordered sequence are shifted from one model execution to the next (e.g., as novel inputs are added to the input sequence and the oldest inputs discarded), the intermediate outputs of the model units at one or more layers are shifted along the units but remain the same, allowing them to be stored and re-used. The intermediate outputs of units in higher layers of the model (i.e., layers higher than a first input layer) can also be stored and re-used if the effects of their inputs (which are the intermediate outputs of lower-layer units) on their outputs are symmetric or otherwise degenerate with respect to the ordering of the inputs. This is because, in such a scenario, the intermediate outputs of units of such a higher layer simply shift along the units with the shifting of the sequence of inputs from one model execution to the next.

FIG. 1A depicts, by way of a non-limiting example, aspects of a multi-layer machine learning model 100. The input of the model 100 is an ordered set of inputs (e.g., a first ordered set of inputs 110*a*) that result, via execution of the model, in an output (e.g., a first output 120*a* generated from the first ordered set of inputs 110*a*). The individual inputs of the ordered set could be images, scalars (e.g., samples of an audio signal), symbols (e.g., letters or tokens representing written language, symbols representing base pairs of a genetic sequence), vectors (e.g., vectors representing haptic input to a robot, a configuration state of a robot, samples of a multi-channel audio signal), tensors, or some other inputs that are arranged in an ordered sequence. The ordering of the inputs in the sequence could be temporal (e.g., each input in the sequence represents a different point in time, with the inputs arranged in the sequence according to temporal order) or some other ordering (e.g., an ordering of symbols representing nucleobases, amino acids, or some other unit along a biomolecule, an ordering of letters, tokens, or other information representing written language or text).

For the purposes of description, the 'first' input in an ordered set of inputs (e.g., the most recent input, in examples wherein the inputs are ordered by timing) may also be referred to as the latter-most input and the 'last' input (e.g., the oldest or least recent input) may also be referred to at the former-most input. So, 115*a* is the latter-most input of the first ordered set of inputs 110*a* and 117*a* is the former-most input of the first ordered set of inputs 110*a*. Similarly, an input being "more former" means that the input is more toward the 'last' input, while an input being "more latter" means that the input is more toward the 'first' input. Similarly, since a multi-layer machine learning model as described herein can include a number of layers, with each layer including multiple units that receive respective inputs to generate respective outputs (e.g., each unit of a first model layer receives a respective input of the ordered set of inputs and generated therefrom a respective intermediate output), the units of each layer of the model are also ordered and so can be referred to using this "latter" and "former" nomenclature.

FIG. 1A also depicts the execution of the model 100 a first time to generate, from the first ordered set of inputs 110*a*, the first output 120*a*. This includes applying each input of the first ordered set of inputs 110*a* to a respective unit (circles) of a first layer 130*a* of the model 100. This results in the generation of a first set of intermediate outputs 135*a*. These intermediate outputs 135*a* are applied as inputs to units of a second layer 130*b* of the model 100 to generate a second set of intermediate outputs 135*b*. These are in turn applied as inputs to units of a third layer 130*c* of the model 100 to generate a third set of intermediate outputs 135*c* that are applied as inputs to a unit of a final layer 130*d* of the model 100 to generate the first model output 120*a*.

As shown in FIG. 1A, the pattern of connection between units of the model 100 is that the first layer generates an intermediate output for each of the inputs 110*a* separately, and then each higher layer has a reduced size by consolidating information from multiple units in a lower layer. In the model 100, this includes consolidating the inputs from each lower layer in an overlapping pairwise fashion (i.e., each unit in a given layer other than the first, base layer receives inputs from two neighboring units of the immediately lower layer), such that each layer has one fewer number of units than the immediately lower layer. Thus, for an ordered set of inputs that includes four inputs, the first layer has four units, the second has three, etc. for a total of four layers and ten overall units in the model 100. However, different model types and patterns of connection are possible, leading to different numbers of layers, numbers of units per layer as a function of the number of inputs, etc.

Each unit of the model 100 could include a neural network (e.g., a convolutional neural network), an attentional mechanism, feedforward connections (e.g., to generate an intermediate output as a weighted combination of the unit input and a version thereof that has been applied to a neural network or other processing), reweighting or filtering stage (e.g., a linear convolutional filter applied to an input image or other n-dimensional input), nonlinear elements (e.g., a rectified linear output stage), or other elements.

Each unit of a particular layer of the model 100 could be identical (i.e., generation of the output of a particular unit includes applying, to the input of that unit, the same operations using the same weights or other parameters as are applied to the inputs of other units in the particular layer to generate their respective intermediate outputs). In such examples, the intermediate output(s) can be stored for later re-use when executing the model on updated ordered sets of inputs that include one or more inputs in common with the first ordered set of inputs 110*a*. Where the inputs to units of higher layers are degenerate with respect to their order of application to the units (e.g., applying first and second intermediate outputs in that order as inputs to a unit results the same outputs from the unit as applying the first and second intermediate outputs in opposite order as inputs to the unit), such storage and re-use of intermediate outputs can be expanded to other layers of the model, further reducing the computational cost to re-execute the model on updated sets of inputs.

Figure 1B:
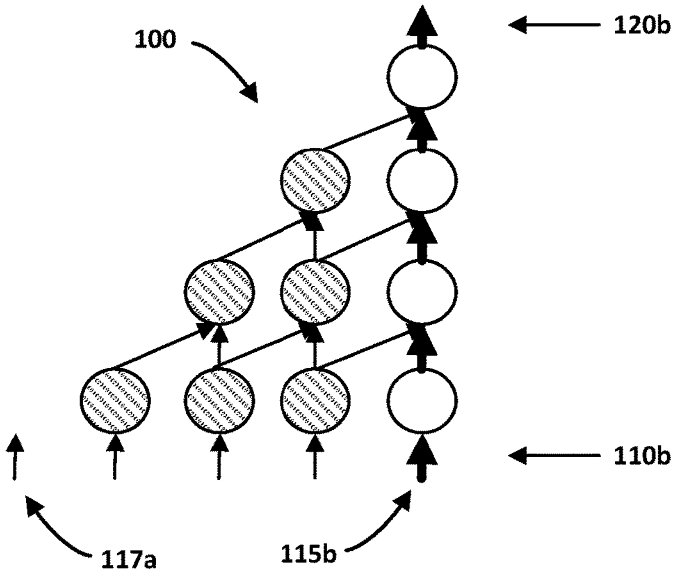
FIG. 1B illustrates aspects of executing a multi-layer machine learning model, according to an example embodiment.

FIG. 1B depicts an example execution of the model 100 to generate a second output 120*b* based on a second ordered set of inputs 110*b* that is an updated version of the first ordered set of inputs 110*a*. In this example, a single novel input 115*b* has been added at the latter-most element of the second ordered set of inputs 110*b*, with the former-most input 117*a* discarded and the remainder of latter inputs of the first ordered set of inputs 110*a* being shifted one element in the former direction, becoming former inputs of the second ordered set of inputs 110*b* obtained by this input update process. Since each unit is identical within each layer of the model 100, and the inputs of each unit of the second and higher layers of the model are degenerate with respect to their ordering, most of the intermediate outputs of most of the units (which are depicted by diagonal hatching) are identical to intermediate outputs generated in the process of previously generating the first output 120*a* for the first ordered set of inputs 110*a*. Thus, if those intermediate outputs are stored (or at least, if at least one latter-most intermediate output is stored for each layer of the model), the stored intermediate outputs can later be re-used instead of being re-computed, thus saving the computational cost of re-executing their respective units of the model 100. As shown in FIG. 1B, this includes computing only the latter-most unit (open circles) of each layer, generating a single new intermediate outputs from each (bold arrows). These new intermediate outputs can then be stored for re-use in evaluating the model for subsequent updated ordered sets of inputs.

Note that, since the units of layers above the first layer in the model 100 are degenerate with respect to the ordering of their inputs (i.e., the order of the two inputs received from lower-level inputs is irrelevant to the output generated therefrom), then the intermediate outputs from units higher than the first layer can also be stored and re-used. Thus, to perform an updated execution of such a model when replacing only the latter-most input of the ordered sequence, only the intermediate output from the latter-most unit of each layer needs to be stored in order to achieve maximal re-use of previously-computed intermediate outputs (intermediate outputs from more former units can be discarded). Thus, the execution of the model 100 when such stored intermediate outputs are available is illustrated by FIG. 1C, which depicts only the latter-most unit of each layer of the model 100 receiving (i) the stored latter-most intermediate output generated by the prior execution of the model and (ii) a novel input (either a novel, latter-most input of the updated ordered set of inputs, or a novel intermediate output newly computed by the unit of the immediately lower layer).

Figure 1C:
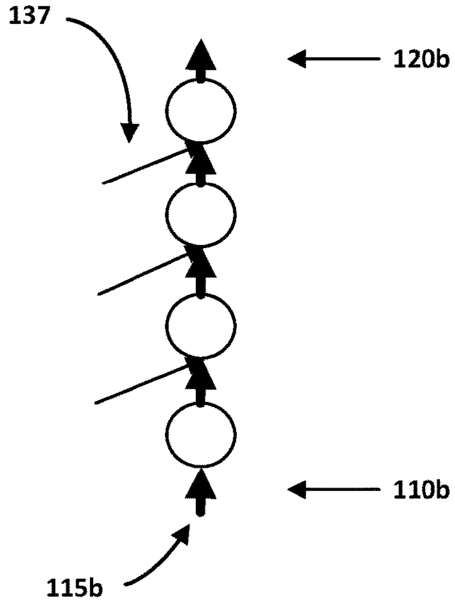
FIG. 1C illustrates aspects of executing a multi-layer machine learning model, according to an example embodiment.

FIG. 1C could also depict the first (and subsequent) execution(s) of the model 100 when prior inputs (and corresponding stored intermediate outputs) are not yet available (e.g., due to a stream of such inputs only having just begun, such that only the first input, or fewer than all of the inputs, is available). In such an example, the "stored latter-most intermediate outputs generated by the prior execution of the model" could be initialized to all zeros, random values, or some other initialization state in order to facilitate the first execution of only the latter-most units of each layer of the model 100. This can be done to provide an initial input earlier and/or to reduce a variability in the latency of execution of the model, thereby avoiding a significant increase in model execution time that would be associated with executing the model the first time, once all inputs are available, by executing all of the elements of each layer of the model (e.g., as depicted in FIG. 1A). Additionally or alternatively, the final output of such a partial model execution (using 'all zero' or otherwise initialized intermediate outputs) could be discarded, with the partial model execution used to gradually build up a set of stored intermediate outputs to facilitate executing the model in a reduced-latency manner once the necessary amount of inputs have been received.

Storage of previously-computed intermediate outputs could be performed in a manner to further improve the execution of a model as described herein (e.g., to reduce the cost of such a computation, or to improve a speed or latency of completion of such a computation given finite computational resources). For example, the stored intermediate output(s) could be stored in a cache on the same integrated circuit (e.g., a GPU chip, a TPU chip) as the processor(s) used to perform the computation of the model. Additionally or alternatively, the intermediate output(s) could be stored in a RAM or other memory that is on a separate integrated circuit from such processor(s) but still on the same subassembly (e.g., the same GPU card, the same TPU card) so as to provide the processor(s) with higher-speed and/or higher-bandwidth access to the stored intermediate outputs (e.g., via on-chip memory bus(es)) without using slower interconnects to memory off of the subassembly (e.g., via a relatively slower PCI Express bus).

To provide enhanced benefits with respect to speed and cost of execution of machine learning models, the location of execution of the models, of storage of previous-computed intermediate results, and/or of other tasks related to the model execution could be appropriately partitioned. For example, a camera driver or other software operations (e.g., a camera API) could be executed by a CPU of a laptop, server, robot controller, or other system to generate ordered inputs to a machine learning model (e.g., ordered image frames of a video stream). Such a CPU could then send, to a GPU, TPU, or other coprocessor system, an indication of such a first ordered set of inputs (e.g., an ordered set of images generated by the camera). The coprocessor could then execute the machine learning model based on the first ordered set of inputs, generating an output (which could be transmitted back to the CPU, e.g., to inform to control of a robot) and storing, in a local memory of the coprocessor, one or more intermediate outputs of the machine learning model for later re-use. The CPU could later transmit, to the coprocessor, an indication of one or more novel inputs (e.g., one or more new images generated by the camera) for use in re-executing the model to generate an updated output, based on a second ordered set of inputs that includes the novel input(s) at the latter-most elements of the second ordered set of inputs and that includes, as former inputs, a set of latter inputs of the first ordered set of inputs. The coprocessor could then re-execute the model based on the novel input(s) and the set of intermediate outputs stored on the local memory of the coprocessor.

As noted above, such operation can result in reduced overall computational cost to execute the machine learning model by re-using model intermediate outputs from one execution to the next as the ordered set of inputs to the model is less than fully replaced from one execution to the next (e.g., as only one input of the ordered set of inputs is replaced between each execution). Such operation can also result in reduced bandwidth usage of an interconnect between the CPU and the coprocessor, as only the novel input(s) need to be transmitted to re-execute the model based on the novel input(s). This is because the coprocessor already has stored thereon intermediate outputs that represent the effects, on the machine learning model, of the previously-transmitted inputs. This allows fewer than all of the relevant inputs (e.g., only the most novel image of a video stream, rather than all of the images of the video stream) to be transmitted to the coprocessor in order to obtain the model output, thereby resulting in reduced CPU-to-coprocessor link bandwidth usage.

The model 100 described in connection with FIGS. 1A-C is configured such that only the intermediate outputs of the latter-most unit in each layer of the model need to be stored for later re-use in order to maximally reduce the computational cost of re-executing the model based on an updated ordered set of inputs that has been updated by adding a single novel input thereto. This is only intended as a non-limiting example; models configured in different ways may require the storage of additional or alternative intermediate outputs thereof in order to maximally reduce the computational cost of re-executing such a model based on an updated ordered set of inputs. For example, if the units in a particular layer of such a model received as inputs intermediate outputs of overlapping sets of three (or more) neighboring units of an immediately lower layer, then it would be necessary to store the intermediate outputs of two (or more) of the latter-most units of the particular layer in order to maximally reduce the computational cost to re-execute the model. In another example, adding more than one novel input as the latter-most elements of an updated ordered set of inputs to the model could necessitate the storage of more than the intermediate outputs of the latter-most units of each layer of the model.

In yet another example, the machine learning model could be a dilated multi-layer model. Such a model, as compared to the 'dense' multi-layer model depicted in FIGS. 1A-1C, does not apply overlapping sets of inputs from lower model layers as inputs to higher model layers. Instead, the sets of inputs that a given unit of such a model receives from neighboring units of an immediately lower layer are non-overlapping. For example, the connections between units across the layers of such a model could be organized as a binary tree. This allows the number of units of the model (and thus the computational cost of executing the model) to be reduced while extending the length of the input on which the model output is based.

Figure 2A:
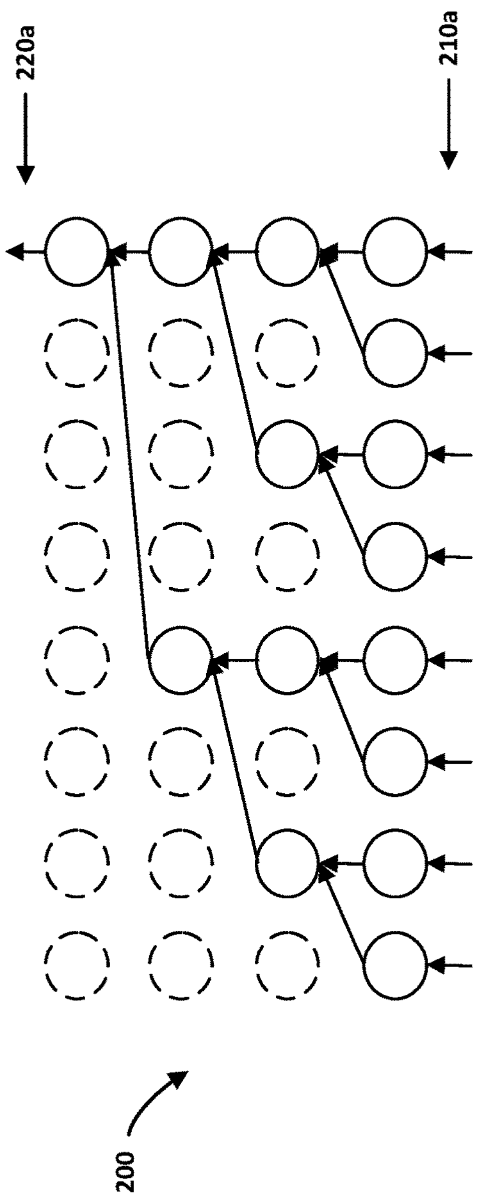
FIG. 2A illustrates aspects of a multi-layer machine learning model, according to an example embodiment.

FIG. 2A depicts, by way of a non-limiting example, aspects of such a dilated multi-layer machine learning model 200. The input of the model 200 is an ordered set of inputs (e.g., a first ordered set of inputs 210*a*) that result, via execution of the model, in an output (e.g., a first output 220*a* generated from the first ordered set of inputs 210*a*). In contrast to the structure of the model 100 of FIGS. 1A-C, units of layers of the model 200 other than the first layer (which receives the inputs of the ordered set of inputs) receive inputs from non-overlapping sets of neighboring units in an immediately lower layer (i.e., the intermediate output of each unit of the model is received as an input by only one unit in the layer above, rather than by two or more).

Figure 2C:
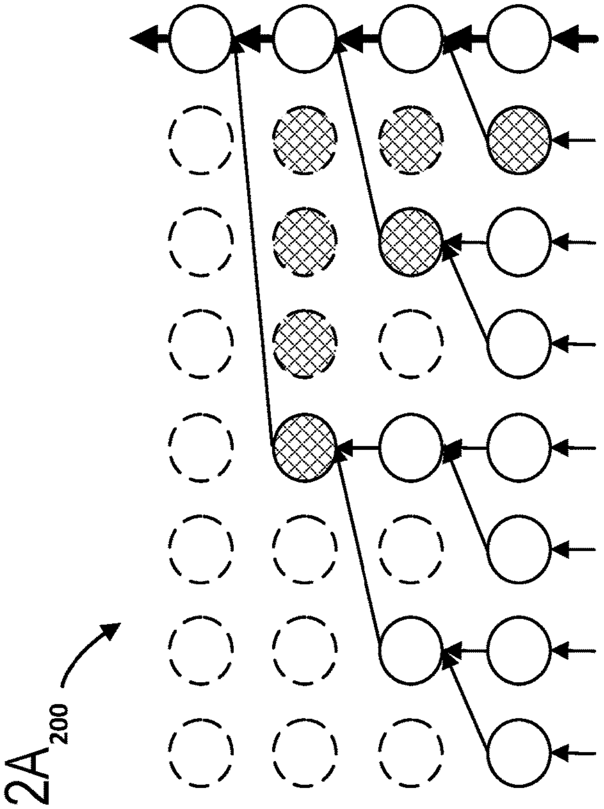
FIG. 2C illustrates aspects of executing a multi-layer machine learning model, according to an example embodiment.
Figure 2B:
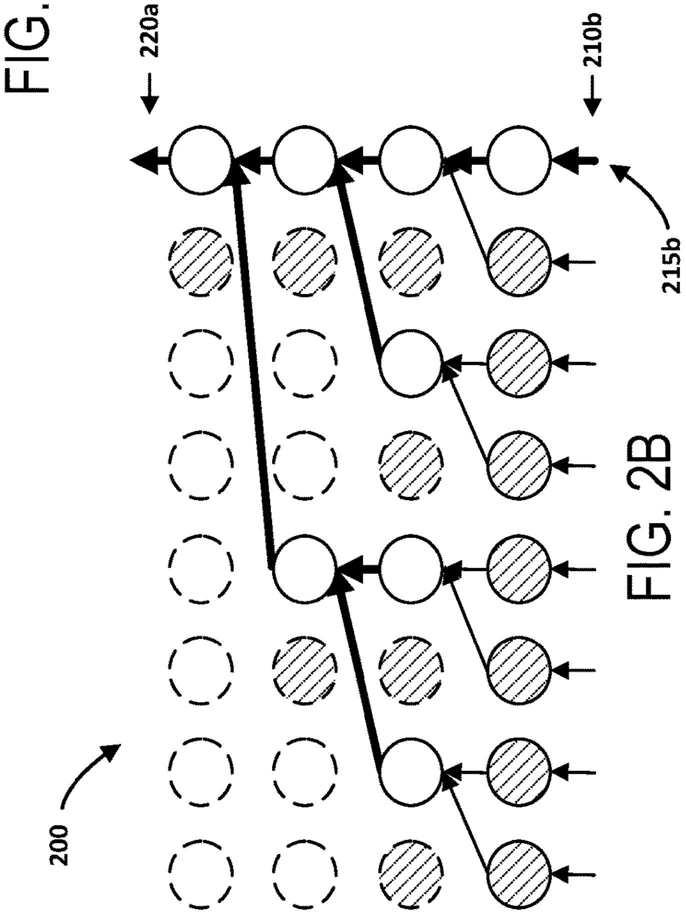
FIG. 2B illustrates aspects of executing a multi-layer machine learning model, according to an example embodiment.

FIG. 2B shows the model 200 after the first output 220*a* has been computed for the first ordered set of inputs 210*a*, when a second output 220*a* is being computed for a second ordered set of inputs 210*b* that includes a single novel input 215*b* as the latter-most element thereof but that otherwise consists of the latter inputs of the first ordered set of inputs 210*a* shifted one position former-ward to form the former inputs of the second ordered set of inputs 210*b*. Thus, some of the intermediate outputs for this second execution of the model (for the second ordered set of inputs 210*b*) have already been computed (output from the units indicated by diagonal-hashed units) and thus could be re-used to reduce the computational cost of generating the second output 220*a*. Thus, only a subset of the intermediate outputs would need to be computed (indicated by bold arrows) to generate the second output 220*a*.

Note that, similar to the scenario depicted in FIG. 1C, not all of the intermediate outputs from each unit need to be stored for later re-use in order to maximally reduce the computational cost of executing the model for future updated ordered sets of inputs. FIG. 2C indicates (by cross-hatching of the set of corresponding model units) which intermediate outputs could be stored to achieve such a reduction for the model 200. If all of the indicated intermediate outputs have been stored for the model, then generation of an updated output for an updates ordered set of inputs (that has been updated by adding a novel input in the latter-most position and shifting the remainder of the input by one position former-ward) required only the execution of the latter-most unit in each layer of the model 200 (indicated by the bold arrows in FIG. 2C).

Note that the model configuration of FIGS. 2A-C is intended only as a non-limiting example embodiment of a dilated model to which the methods herein could be applied to reduce the computational cost of executing such a model. Such a dilated model could include more or fewer layers, and could have a pattern of connectedness that had more or fewer units from each layer acting as inputs to the next higher layer (e.g., sets of three non-overlapping neighboring units providing intermediate outputs as inputs to each unit of the next-higher layer). In such examples, the pattern of intermediate outputs needed to be stored from prior model executions in order to maximally reduce the computational cost of re-executing the model could differ from that depicted. Where the dilated model applies the intermediate outputs of neighboring pairs of non-overlapping model units as inputs to the next higher layer, the number of intermediate outputs of the latter-most units of a given layer that should be stored to maximize the benefits of the re-use of such stored outputs can be expressed as $2^{n-1}$, where n is the number of the layer within the model (with n=0 being the lowest layer, whose units each receive a respective single input of the ordered set of inputs, and n=1 being the next-higher layer which receives, as inputs, the intermediate outputs of the n=0 lowest layer, etc.).

II. EXAMPLE MACHINE LEARNING MODELS AND TRAINING THEREOF

A machine learning model as described herein may include, but is not limited to: an artificial neural network (e.g., Transformers, layered models wherein each layer includes two or more sub-layers one or more of which could include artificial neural networks, convolutional neural networks, a recurrent neural network, a Bayesian network, a hidden Markov model, a Markov decision process, a logistic regression function, a support vector machine, a suitable statistical machine learning algorithm, and/or a heuristic machine learning system), a support vector machine, a regression tree, an ensemble of regression trees (also referred to as a regression forest), a decision tree, an ensemble of decision trees (also referred to as a decision forest), or some other machine learning model architecture or combination of architectures.

An artificial neural network (ANN) could be configured in a variety of ways. For example, the ANN could include two or more layers, could include units having linear, logarithmic, or otherwise-specified output functions, could include fully or otherwise-connected neurons, could include recurrent and/or feed-forward connections between neurons in different layers, could include filters or other elements to process input information and/or information passing between layers, or could be configured in some other way to facilitate the processing of input sequences, sets of embedding vectors representing input sequences, downstream vectors and/or set of vector determined by the operation of one or more layers or sublayers of a multi-layer model, and/or individual vectors (e.g., embedding vectors representing tokens of an input sequence, downstream vectors representing the processing of such embedding vectors by one or more layers or sublayers of a multi-layer model).

An ANN could include one or more filters that could be applied to the input and the outputs of such filters could then be applied to the inputs of one or more neurons of the ANN. For example, such an ANN could be or could include a convolutional neural network (CNN). Convolutional neural networks are a variety of ANNs that are configured to facilitate ANN-based classification or other processing based on images or other large-dimensional inputs whose elements are organized within two or more dimensions. The organization of the ANN along these dimensions may be related to some structure in the input structure (e.g., as relative location within the one-dimensional space of sequence of tokens can be related to similarity or relevance between tokens of the sequence).

In example embodiments, a CNN includes at least one two-dimensional (or higher-dimensional) filter that is applied to an input; the filtered input is then applied to neurons of the CNN (e.g., of a convolutional layer of the CNN). The convolution of such a filter and an input could represent the color values of a pixel or a group of pixels from the input, in embodiments where the input is an image. A set of neurons of a CNN could receive respective inputs that are determined by applying the same filter to an input. Additionally or alternatively, a set of neurons of a CNN could be associated with respective different filters and could receive respective inputs that are determined by applying the respective filter to the input. Such filters could be trained during training of the CNN or could be pre-specified. For example, such filters could represent wavelet filters, center-surround filters, biologically-inspired filter kernels (e.g., from studies of animal visual processing receptive fields), or some other pre-specified filter patterns.

A CNN or other variety of ANN could include multiple convolutional layers (e.g., corresponding to respective different filters and/or features), pooling layers, rectification layers, fully connected layers, or other types of layers. Convolutional layers of a CNN represent convolution of an input image, or of some other input (e.g., of a filtered, downsampled, or otherwise-processed version of an input image), with a filter. Pooling layers of a CNN apply nonlinear downsampling to higher layers of the CNN, e.g., by applying a maximum, average, L2-norm, or other pooling function to a subset of neurons, outputs, or other features of the higher layer(s) of the CNN. Rectification layers of a CNN apply a rectifying nonlinear function (e.g., a non-saturating activation function, a sigmoid function) to outputs of a higher layer. Fully connected layers of a CNN receive inputs from many or all of the neurons in one or more higher layers of the CNN. The outputs of neurons of one or more fully connected layers (e.g., a final layer of an ANN or CNN) could be used to determine information about areas of an input image (e.g., for each of the pixels of an input image) or for the image as a whole.

Neurons in a CNN can be organized according to corresponding dimensions of the input. For example, where the input is a sequence of token (a one-dimensional input, with each token representing one or more words, or fractions of words, in an input text string), neurons of the CNN (e.g., of an input layer of the CNN, of a pooling layer of the CNN) could correspond to locations in the one-dimensional input string/sequence. Connections between neurons and/or filters in different layers of the CNN could be related to such locations.

Figure 3:
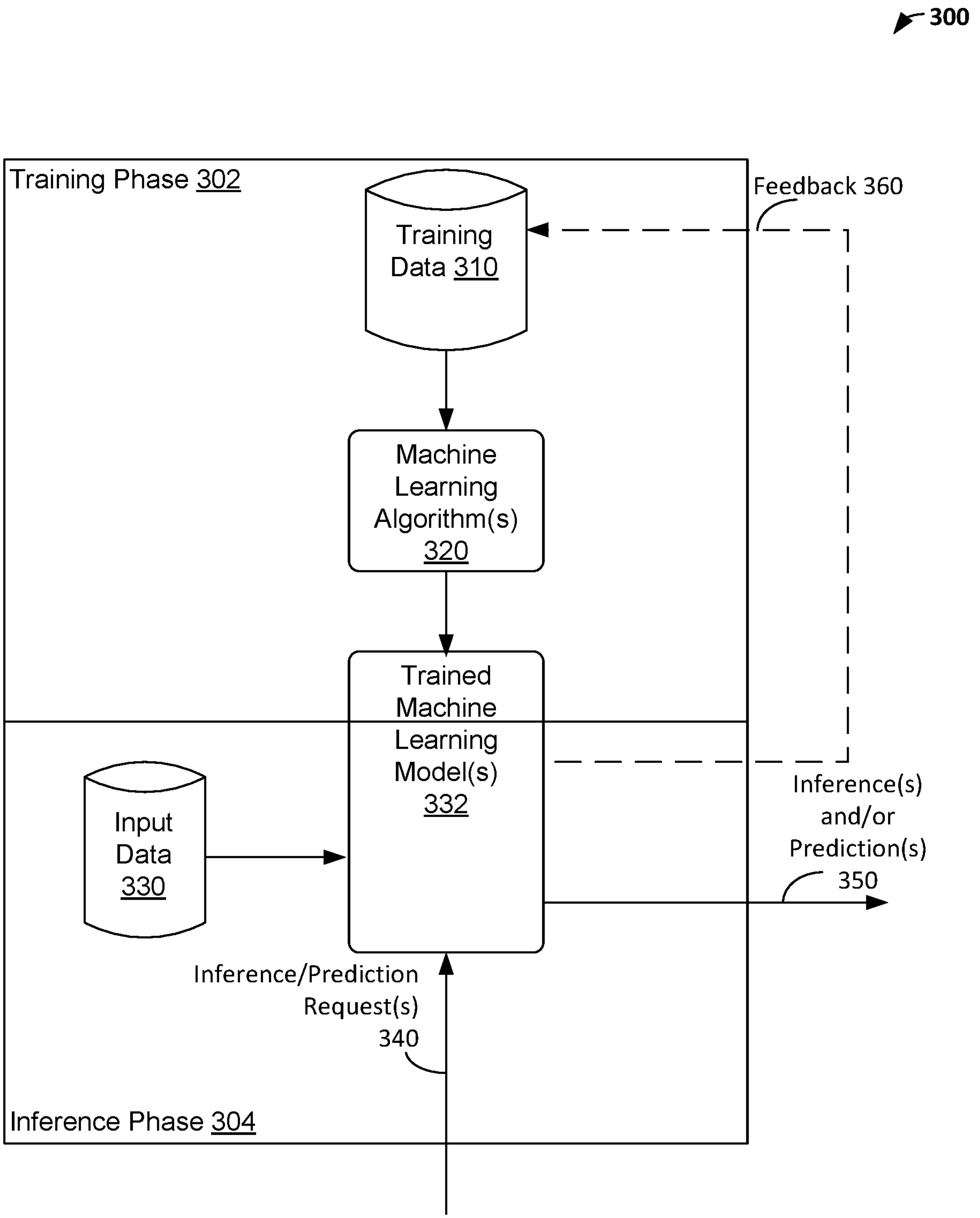
FIG. 3 is a diagram illustrating training and inference phases of a machine learning model, in accordance with example embodiments.

FIG. 3 shows diagram 300 illustrating a training phase 302 and an inference phase 304 of trained machine learning model(s) 332, in accordance with example embodiments. Some machine learning techniques involve training one or more machine learning algorithms, on an input set of training data to recognize patterns in the training data and provide output inferences and/or predictions about (patterns in the) training data. Such output could take the form of filtered or otherwise modified versions of the input, e.g., an input sequence that represents text in a source language could be modified by the machine learning model into (i) an output sequence that represents text in a target language that has similar meaning or semantic content as the input sequence and/or (ii) an output set of embedding vectors that represent, in a semantic embedding space, the meaning or semantic content of the input sequence. The resulting trained machine learning algorithm can be termed as a trained machine learning model. For example, FIG. 3 shows training phase 302 where one or more machine learning algorithms 320 are being trained on training data 310 to become trained machine learning model 332. Then, during inference phase 304, trained machine learning model 332 can receive input data 330 and one or more inference/prediction requests 340 (perhaps as part of input data 330) and responsively provide as an output one or more inferences and/or predictions 350.

As such, trained machine learning model(s) 332 can include one or more models of one or more machine learning algorithms 320. Machine learning algorithm(s) 320 may include, but are not limited to: an artificial neural network (e.g., a herein-described convolutional neural networks, a recurrent neural network, a Bayesian network, a hidden Markov model, a Markov decision process, a logistic regression function, a support vector machine, a suitable statistical machine learning algorithm, and/or a heuristic machine learning system), a support vector machine, a regression tree, an ensemble of regression trees (also referred to as a regression forest), a decision tree, an ensemble of decision trees (also referred to as a decision forest), or some other machine learning model architecture or combination of architectures. For example, the trained machine learning model(s) 332 could include a plurality of artificial neural networks and other elements related to such networks (e.g., mixing or weighting matrices, sums, products, feedforward connections) arranged according to the multi-layer and sublayer architecture of a Transformer or similar model architecture designed to process input sequences. Machine learning algorithm(s) 320 may be supervised or unsupervised, and may implement any suitable combination of online and offline learning.

In some examples, machine learning algorithm(s) 320 and/or trained machine learning model(s) 332 can be accelerated using on-device coprocessors, such as graphic processing units (GPUs), tensor processing units (TPUs), digital signal processors (DSPs), and/or application specific integrated circuits (ASICs). Such on-device coprocessors can be used to speed up machine learning algorithm(s) 320 and/or trained machine learning model(s) 332. In some examples, trained machine learning model(s) 332 can be trained, reside and execute to provide inferences on a particular computing device, and/or otherwise can make inferences for the particular computing device.

During training phase 302, machine learning algorithm(s) 320 can be trained by providing at least training data 310 as training input using unsupervised, supervised, semi-supervised, and/or reinforcement learning techniques. Unsupervised learning involves providing a portion (or all) of training data 310 to machine learning algorithm(s) 320 and machine learning algorithm(s) 320 determining one or more output inferences based on the provided portion (or all) of training data 310. Supervised learning involves providing a portion of training data 310 to machine learning algorithm(s) 320, with machine learning algorithm(s) 320 determining one or more output inferences based on the provided portion of training data 310, and the output inference(s) are either accepted or corrected based on correct results associated with training data 310. In some examples, supervised learning of machine learning algorithm(s) 320 can be governed by a set of rules and/or a set of labels for the training input, and the set of rules and/or set of labels may be used to correct inferences of machine learning algorithm(s) 320.

Semi-supervised learning involves having correct results for part, but not all, of training data 310. During semi-supervised learning, supervised learning is used for a portion of training data 310 having correct results, and unsupervised learning is used for a portion of training data 310 not having correct results. Reinforcement learning involves machine learning algorithm(s) 320 receiving a reward signal regarding a prior inference, where the reward signal can be a numerical value. During reinforcement learning, machine learning algorithm(s) 320 can output an inference and receive a reward signal in response, where machine learning algorithm(s) 320 are configured to try to maximize the numerical value of the reward signal. In some examples, reinforcement learning also utilizes a value function that provides a numerical value representing an expected total of the numerical values provided by the reward signal over time. In some examples, machine learning algorithm(s) 320 and/or trained machine learning model(s) 332 can be trained using other machine learning techniques, including but not limited to, incremental learning and curriculum learning.

In some examples, machine learning algorithm(s) 320 and/or trained machine learning model(s) 332 can use transfer learning techniques. For example, transfer learning techniques can involve trained machine learning model(s) 332 being pre-trained on one set of data and additionally trained using training data 310. More particularly, machine learning algorithm(s) 320 can be pre-trained on data from one or more computing devices and a resulting trained machine learning model provided to computing device CD1, where CD1 is intended to execute the trained machine learning model during inference phase 304. Then, during training phase 302, the pre-trained machine learning model can be additionally trained using training data 310, where training data 310 can be derived from kernel and non-kernel data of computing device CD1. This further training of the machine learning algorithm(s) 320 and/or the pre-trained machine learning model using training data 310 of CD1's data can be performed using cither supervised or unsupervised learning. Once machine learning algorithm(s) 320 and/or the pre-trained machine learning model has been trained on at least training data 310, training phase 302 can be completed. The trained resulting machine learning model can be utilized as at least one of trained machine learning model(s) 332.

In particular, once training phase 302 has been completed, trained machine learning model(s) 332 can be provided to a computing device, if not already on the computing device. Inference phase 304 can begin after trained machine learning model(s) 332 are provided to computing device CD1.

During inference phase 304, trained machine learning model(s) 332 can receive input data 330 and generate and output one or more corresponding inferences and/or predictions 350 about input data 330. As such, input data 330 can be used as an input to trained machine learning model(s) 332 for providing corresponding inference(s) and/or prediction(s) 350 to kernel components and non-kernel components. For example, trained machine learning model(s) 332 can generate inference(s) and/or prediction(s) 350 in response to one or more inference/prediction requests 340. In some examples, trained machine learning model(s) 332 can be executed by a portion of other software. For example, trained machine learning model(s) 332 can be executed by an inference or prediction daemon to be readily available to provide inferences and/or predictions upon request. Input data 330 can include data from computing device CD1 executing trained machine learning model(s) 332 and/or input data from one or more computing devices other than CD1.

Input data 330 can include a collection of text strings provided by one or more sources. The collection of text strings can include natural language, artificially generated language, text from books, texts from online forums or chats, texts from emails, and/or other text. Other types of input data are possible as well.

Inference(s) and/or prediction(s) 350 can include output text strings, output token sequences, output sets of embedding vectors, numerical values, and/or other output data produced by trained machine learning model(s) 332 operating on input data 330 (and training data 310). In some examples, trained machine learning model(s) 332 can use output inference(s) and/or prediction(s) 350 as input feedback 360. Trained machine learning model(s) 332 can also rely on past inferences as inputs for generating new inferences.

III. EXAMPLE SYSTEMS

Figure 4:
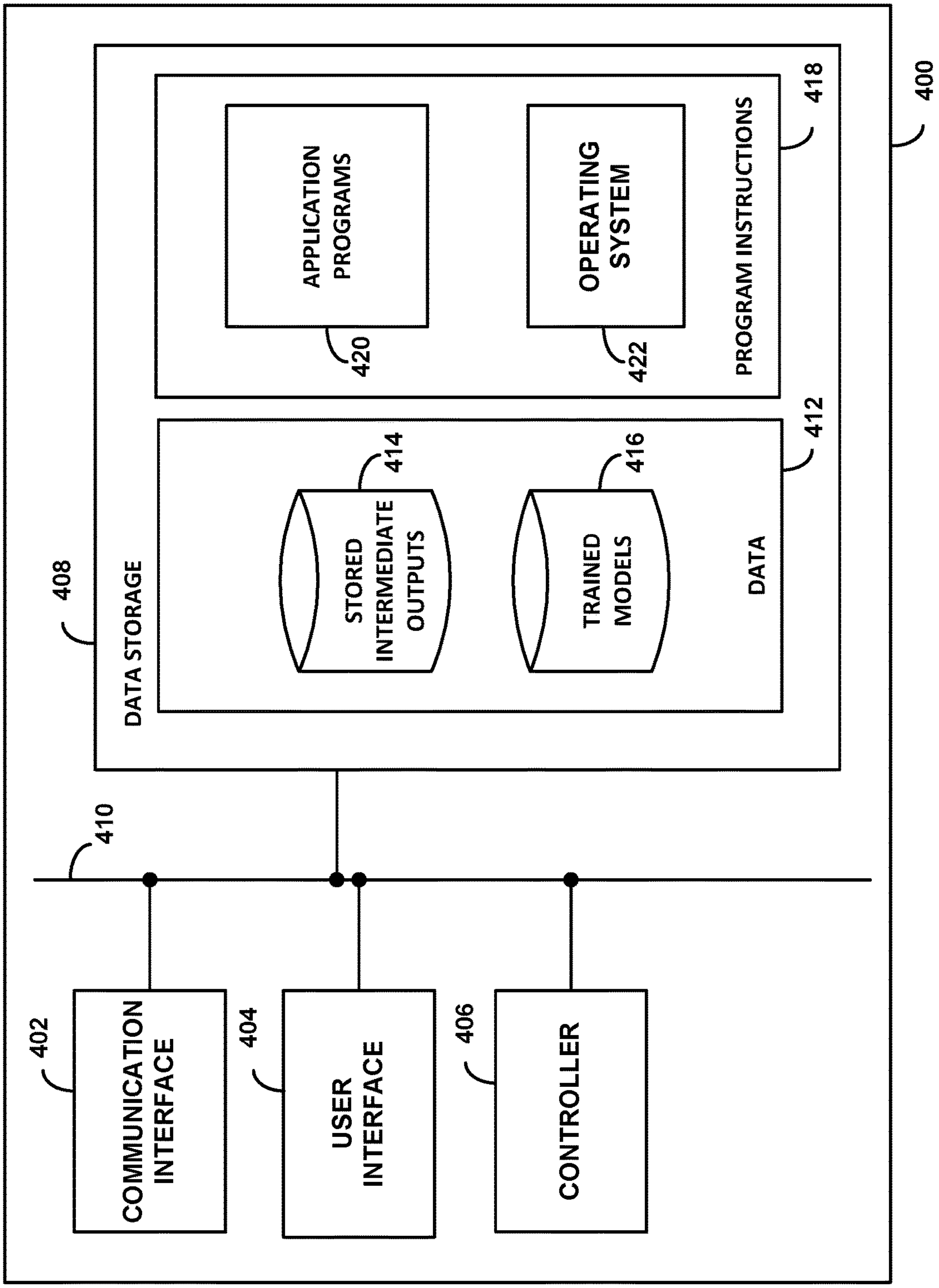
FIG. 4 is a simplified block diagram showing some of the components of an example computing system.

FIG. 4 illustrates an example computing device 400 that may be used to implement the methods described herein. By way of example and without limitation, computing device 400 may be a cellular mobile telephone (e.g., a smartphone), a computer (such as a desktop, notebook, tablet, or handheld computer, a server), elements of a cloud computing system, a robot, a drone, an autonomous vehicle, or some other type of device. It should be understood that computing device 400 may represent a physical computing device such as a server, a particular physical hardware platform on which a machine learning application operates in software, or other combinations of hardware and software that are configured to carry out machine learning functions as described herein.

As shown in FIG. 4, computing device 400 may include a communication interface 402, a user interface 404, a controller 406 (which may include one or more processors), and data storage 408, all of which may be communicatively linked together by a system bus, network, or other connection mechanism 410.

Communication interface 402 may function to allow computing device 400 to communicate, using analog or digital modulation of electric, magnetic, electromagnetic, optical, or other signals, with other devices, access networks, and/or transport networks. Thus, communication interface 402 may facilitate circuit-switched and/or packet-switched communication, such as plain old telephone service (POTS) communication and/or Internet protocol (IP) or other packetized communication. For instance, communication interface 402 may include a chipset and antenna arranged for wireless communication with a radio access network or an access point. Also, communication interface 402 may take the form of or include a wireline interface, such as an Ethernet, Universal Serial Bus (USB), or High-Definition Multimedia Interface (HDMI) port. Communication interface 402 may also take the form of or include a wireless interface, such as a Wifi, BLUETOOTH®, global positioning system (GPS), or wide-area wireless interface (e.g., WiMAX or 3GPP Long-Term Evolution (LTE)). However, other forms of physical layer interfaces and other types of standard or proprietary communication protocols may be used over communication interface 402. Furthermore, communication interface 402 may comprise multiple physical communication interfaces (e.g., a Wifi interface, a BLUETOOTH® interface, and a wide-area wireless interface).

In some embodiments, communication interface 402 may function to allow computing device 400 to communicate, with other devices, remote servers, access networks, and/or transport networks. For example, the communication interface 402 may function to access one or more machine learning models and/or input therefor via communication with a remote server or other remote device or system in order to allow the computing device 400 to use the machine learning model to generate outputs (e.g., sequences of model outputs generated as new input data is obtained) based on input data. For example, the computing system 400 could be an inference server and the remote system could be a robot that generated sense data (e.g., images from a camera, haptic input data) to be applied to a machine learning model in order to determine information about the environment of the robot and/or to control the operation of the robot.

User interface 404 may function to allow computing device 400 to interact with a user, for example to receive input from and/or to provide output to the user. Thus, user interface 404 may include input components such as a keypad, keyboard, touch-sensitive or presence-sensitive panel, computer mouse, trackball, joystick, microphone, and so on. User interface 404 may also include one or more output components such as a display screen which, for example, may be combined with a presence-sensitive panel. The display screen may be based on CRT, LCD, and/or LED technologies, or other technologies now known or later developed. User interface 404 may also be configured to generate audible output(s), via a speaker, speaker jack, audio output port, audio output device, earphones, and/or other similar devices.

Controller 406 may comprise one or more general purpose processors—e.g., microprocessors—and/or one or more special purpose processors—e.g., digital signal processors (DSPs), graphics processing units (GPUs), floating point units (FPUs), network processors, tensor processing units (TPUs), or application-specific integrated circuits (ASICs). In some instances, special purpose processors may be capable of image processing (e.g., application of CNN kernels or other filters to images via, e.g., convolution), machine learning model execution or inference, storage of model intermediate outputs in local memory for later reuse, among other applications or functions. Data storage 408 may include one or more volatile and/or non-volatile storage components, such as magnetic, optical, flash, or organic storage, and may be integrated in whole or in part with controller 406. For example, a portion of the data storage 408 may be implemented as cache or other on-chip memory of a graphics processing unit or tensor processing unit integrated circuit and/or as RAM or some other variety of storage that is collocated with a GPU or TPU, e.g., on a graphics card, tensor acceleration card, or other semi-discrete subsystem of the overall system 400. Such storage could be used to store parameters that define a machine learning model (e.g., weights or other parameters of units of a multi-layer neural network or other multi-unit machine learning model) and/or to store intermediate outputs or other results of execution of a machine learning model for later reuse (e.g. as part of the methods described herein, in order to reduce the computational cost, power cost, and/or latency of execution of a machine learning model on temporally updated inputs by re-using stored intermediate outputs rather than re-computing them). Data storage 408 may include removable and/or non-removable components.

Controller 406 may be capable of executing program instructions 418 (e.g., compiled or non-compiled program logic and/or machine code) stored in data storage 408 to carry out the various functions described herein. Therefore, data storage 408 may include a non-transitory computer-readable medium, having stored thereon program instructions that, upon execution by computing device 400, cause computing device 400 to carry out any of the methods, processes, or functions disclosed in this specification and/or the accompanying drawings. The execution of program instructions 418 by controller 406 may result in controller 406 using data 412.

By way of example, program instructions 418 may include an operating system 422 (e.g., an operating system kernel, device driver(s), and/or other modules) and one or more application programs 420 (e.g., functions for executing trained machine learning models) installed on computing device 400. Data 412 may include stored intermediate outputs 414 (e.g., intermediate outputs of the units of one or more layers of a multi-layer machine learning model) that could be used to speed the execution of a model when an input is partially novel and partially 'already seen' and/or one or more trained machine learning models 416.

Application programs 420 may communicate with operating system 422 through one or more application programming interfaces (APIs). These APIs may facilitate, for instance, application programs 420 reading and/or writing a trained machine learning model 416, transmitting or receiving information via communication interface 402, receiving and/or displaying information on user interface 404, and so on.

Application programs 420 may take the form of "apps" that could be downloadable to computing device 400 through one or more online application stores or application markets (via, e.g., the communication interface 402). However, application programs can also be installed on computing device 400 in other ways, such as via a web browser or through a physical interface (e.g., a USB port) of the computing device 400.

IV. EXAMPLE METHODS

Figure 5:
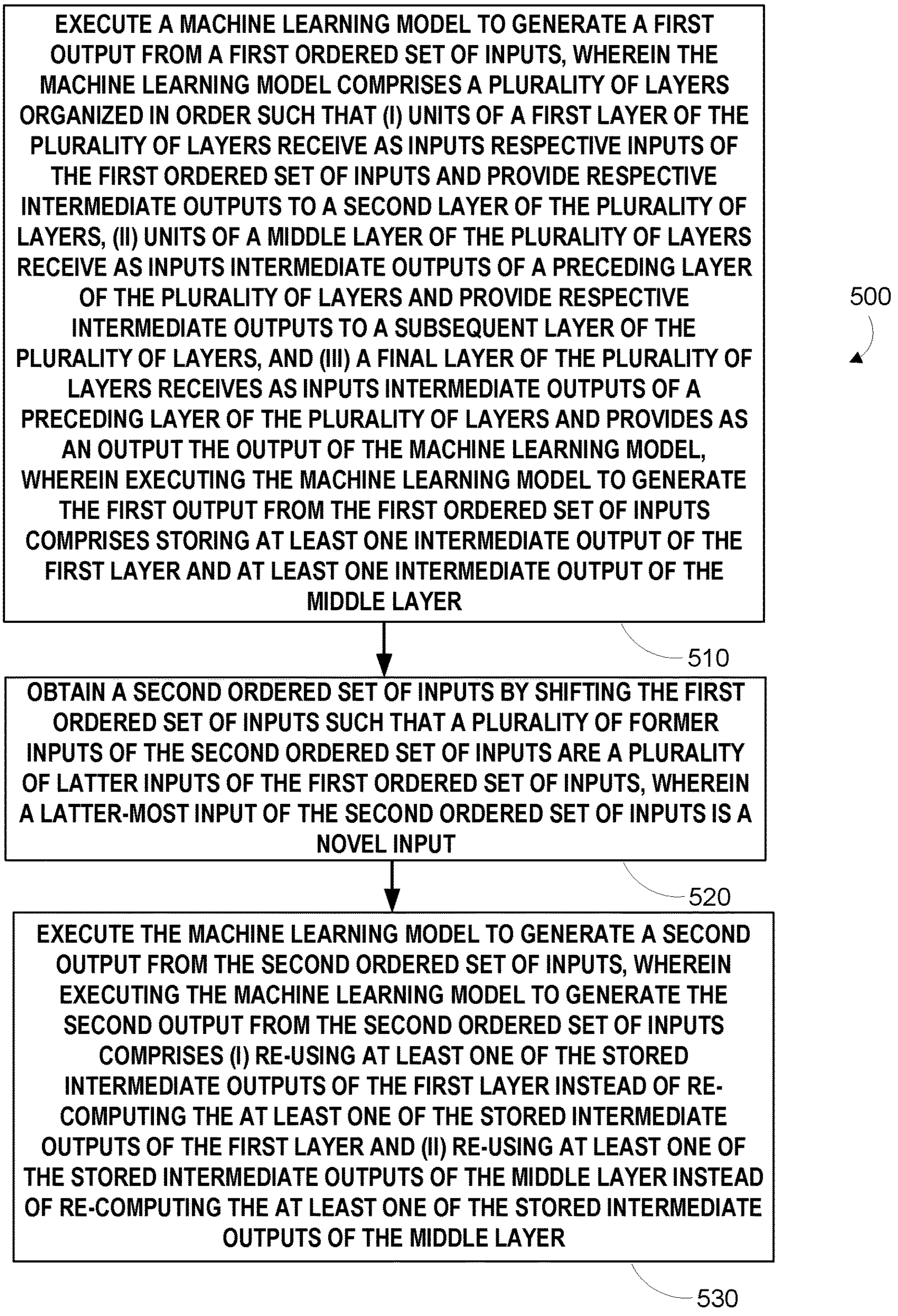
FIG. 5 is a flowchart of a method.

FIG. 5 is a flowchart of a method 500 as described herein. The method 500 includes executing a machine learning model to generate a first output from a first ordered set of inputs, wherein the machine learning model comprises a plurality of layers organized in order such that (i) units of a first layer of the plurality of layers receive as inputs respective inputs of the first ordered set of inputs and provide respective intermediate outputs to a second layer of the plurality of layers, (ii) units of a middle layer of the plurality of layers receive as inputs intermediate outputs of a preceding layer of the plurality of layers and provide respective intermediate outputs to a subsequent layer of the plurality of layers, and (iii) a final layer of the plurality of layers receives as inputs intermediate outputs of a preceding layer of the plurality of layers and provides as an output the output of the machine learning model, wherein executing the machine learning model to generate the first output from the first ordered set of inputs comprises storing at least one intermediate output of the first layer and at least one intermediate output of the middle layer (510). The method 500 additionally includes obtaining a second ordered set of inputs by shifting the first ordered set of inputs such that a plurality of former inputs of the second ordered set of inputs are a plurality of latter inputs of the first ordered set of inputs, wherein a latter-most input of the second ordered set of inputs is a novel input (520). The method 500 yet further includes executing the machine learning model to generate a second output from the second ordered set of inputs, wherein executing the machine learning model to generate the second output from the second ordered set of inputs comprises (i) re-using at least one of the stored intermediate outputs of the first layer instead of re-computing the at least one of the stored intermediate outputs of the first layer and (ii) re-using at least one of the stored intermediate outputs of the middle layer instead of re-computing the at least one of the stored intermediate outputs of the middle layer (530). The method 500 could include additional or alternative steps or features.

V. CONCLUSION

The above detailed description describes various features and functions of the disclosed systems, devices, and methods with reference to the accompanying figures. In the figures, similar symbols typically identify similar components, unless the context indicates otherwise. The illustrative embodiments described in the detailed description, figures, and claims are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flowcharts in the figures and as discussed herein, each step, block and/or communication may represent a processing of information and/or a transmission of information in accordance with example embodiments. Alternative embodiments are included within the scope of these example embodiments. In these alternative embodiments, for example, functions described as steps, blocks, transmissions, communications, requests, responses, and/or messages may be executed out of order from that shown or discussed, including in substantially concurrent or in reverse order, depending on the functionality involved. Further, more or fewer steps, blocks and/or functions may be used with any of the message flow diagrams, scenarios, and flow charts discussed herein, and these message flow diagrams, scenarios, and flow charts may be combined with one another, in part or in whole.

A step or block that represents a processing of information may correspond to circuitry that can be configured to perform the specific logical functions of a herein-described method or technique. Alternatively or additionally, a step or block that represents a processing of information may correspond to a module, a segment, or a portion of program code (including related data). The program code may include one or more instructions executable by a processor for implementing specific logical functions or actions in the method or technique. The program code and/or related data may be stored on any type of computer-readable medium, such as a storage device, including a disk drive, a hard drive, or other storage media.

The computer-readable medium may also include non-transitory computer-readable media such as computer-readable media that stores data for short periods of time like register memory, processor cache, and/or random access memory (RAM). The computer-readable media may also include non-transitory computer-readable media that stores program code and/or data for longer periods of time, such as secondary or persistent long term storage, like read only memory (ROM), optical or magnetic disks, and/or compact-disc read only memory (CD-ROM), for example. The computer-readable media may also be any other volatile or non-volatile storage systems. A computer-readable medium may be considered a computer-readable storage medium, for example, or a tangible storage device.

Moreover, a step or block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method comprising:

executing a machine learning model to generate a first output from a first ordered set of inputs, wherein the machine learning model comprises a plurality of layers organized in order such that (i) units of a first layer of the plurality of layers receive as inputs respective inputs of the first ordered set of inputs and provide respective intermediate outputs to a second layer of the plurality of layers, (ii) units of a middle layer of the plurality of layers receive as inputs intermediate outputs of a preceding layer of the plurality of layers and provide respective intermediate outputs to a subsequent layer of the plurality of layers, the middle layer comprising two adjacent units that provide outputs to a unit of the subsequent layer, and (iii) a final layer of the plurality of layers receives as inputs intermediate outputs of a preceding layer of the plurality of layers and provides as an output the output of the machine learning model, wherein executing the machine learning model to generate the first output from the first ordered set of inputs comprises storing at least one intermediate output of the first layer and at least one intermediate output of the middle layer;

obtaining a second ordered set of inputs by shifting the first ordered set of inputs such that a plurality of former inputs of the second ordered set of inputs are a plurality of latter inputs of the first ordered set of inputs, wherein a latter-most input of the second ordered set of inputs is a novel input; and executing the machine learning model to generate a second output from the second ordered set of inputs, wherein executing the machine learning model to generate the second output from the second ordered set of inputs comprises (i) re-using at least one of the stored intermediate outputs of the first layer instead of re-computing the at least one of the stored intermediate outputs of the first layer and (ii) re-using at least one of the stored intermediate outputs of the middle layer instead of re-computing the at least one of the stored intermediate outputs of the middle layer.

2. The method of claim 1, wherein only the latter-most input of the second ordered set of inputs is a novel input and the remainder of the inputs of the second ordered set of inputs are the latter-most inputs of the first ordered set of inputs, and wherein storing at least one intermediate outputs of the first layer and at least one intermediate output of the middle layer comprises storing the intermediate output of the latter-most unit of the first layer and the intermediate output of the latter-most unit of the middle layer.

3. The method of claim 1, wherein each input of the first ordered set of inputs comprises an image.

4. The method of claim 3, wherein the first output represents at least one of a location, an orientation, a translational velocity, or a rotational velocity of an object depicted in at least one image of the first ordered set of inputs.

5. The method of claim 1, wherein each unit of a given layer of the machine learning model other than the first layer receives inputs from a respective non-overlapping set of adjacent units of an immediately lower layer of the machine learning model, and wherein executing the machine learning model to generate the second output from the second ordered set of inputs comprises, for a given layer of the machine learning model other than the first layer, re-using at least one stored intermediate output from a set of two or more stored intermediate outputs for the given layer instead of re-computing the at least one stored intermediate output of the given layer.

6. The method of claim 5, wherein each unit of a given layer of the machine learning model other than the first layer receives inputs from a respective non-overlapping set of two adjacent units of an immediately lower layer of the machine learning model, and wherein the method further comprises storing, for an $n^{th}$ layer of the machine learning model, $2^{n-1}$ intermediate outputs.

7. The method of claim 1, further comprising:

transmitting, from a first controller that comprises one or more processors to a second controller that comprises one or more processors, an indication of the first ordered set of inputs, wherein executing the machine learning model to generate the first output from the first ordered set of inputs is performed by the second controller, and wherein storing at least one intermediate output of the first layer and at least one intermediate output of the middle layer comprises storing the at least one intermediate output of the first layer and the at least one intermediate output of the middle layer in a memory of the second controller; and subsequently transmitting, from the first controller to the second controller, an indication of the novel input, wherein obtaining the second ordered set of inputs and executing the machine learning model to generate the second output from the second ordered set of inputs are performed by the second controller using the at least one intermediate output of the first layer and the at least one intermediate output of the middle layer stored in the memory of the second controller.

8. The method of claim 7, wherein the second controller comprises at least one of a graphics processing unit or a tensor processing unit.

9. A non-transitory computer readable medium having stored thereon program instructions executable by at least one processor to cause the at least one processor to perform a method comprising:

executing a machine learning model to generate a first output from a first ordered set of inputs, wherein the machine learning model comprises a plurality of layers organized in order such that (i) units of a first layer of the plurality of layers receive as inputs respective inputs of the first ordered set of inputs and provide respective intermediate outputs to a second layer of the plurality of layers, (ii) units of a middle layer of the plurality of layers receive as inputs intermediate outputs of a preceding layer of the plurality of layers and provide respective intermediate outputs to a subsequent layer of the plurality of layers, the middle layer comprising two adjacent units that provide outputs to a unit of the subsequent layer, and (iii) a final layer of the plurality of layers receives as inputs intermediate outputs of a preceding layer of the plurality of layers and provides as an output the output of the machine learning model, wherein executing the machine learning model to generate the first output from the first ordered set of inputs comprises storing at least one intermediate output of the first layer and at least one intermediate output of the middle layer;

obtaining a second ordered set of inputs by shifting the first ordered set of inputs such that a plurality of former inputs of the second ordered set of inputs are a plurality of latter inputs of the first ordered set of inputs, wherein a latter-most input of the second ordered set of inputs is a novel input; and executing the machine learning model to generate a second output from the second ordered set of inputs, wherein executing the machine learning model to generate the second output from the second ordered set of inputs comprises (i) re-using at least one of the stored intermediate outputs of the first layer instead of re-computing the at least one of the stored intermediate outputs of the first layer and (ii) re-using at least one of the stored intermediate outputs of the middle layer instead of re-computing the at least one of the stored intermediate outputs of the middle layer.

10. The computer readable medium of claim 9, wherein only the latter-most most input of the second ordered set of inputs is a novel input and the remainder of the inputs of the second ordered set of inputs are the latter-most inputs of the first ordered set of inputs, and wherein storing at least one intermediate outputs of the first layer and at least one intermediate output of the middle layer comprises storing the intermediate output of the latter-most unit of the first layer and the intermediate output of the latter-most unit of the middle layer.

11. The computer readable medium of claim 9, wherein each input of the first ordered set of inputs comprises an image.

12. The computer readable medium of claim 11, wherein the first output represents at least one of a location, an orientation, a translational velocity, or a rotational velocity of an object depicted in at least one image of the first ordered set of inputs.

13. The computer readable medium of claim 9, wherein each unit of a given layer of the machine learning model other than the first layer receives inputs from a respective non-overlapping set of adjacent units of an immediately lower layer of the machine learning model, and wherein executing the machine learning model to generate the second output from the second ordered set of inputs comprises, for a given layer of the machine learning model other than the first layer, re-using at least one stored intermediate output from a set of two or more stored intermediate outputs for the given layer instead of re-computing the at least one stored intermediate output of the given layer.

14. The computer readable medium of claim 13, wherein each unit of a given layer of the machine learning model other than the first layer receives inputs from a respective non-overlapping set of two adjacent units of an immediately lower layer of the machine learning model, and wherein the method further comprises storing, for an $n^{th}$ layer of the machine learning model, $2^{n-1}$ intermediate outputs.

15. A system comprising:

at least one processor; and a non-transitory computer readable medium having stored thereon program instructions executable by the at least one processor to cause the at least one processor to perform a method comprising:

executing a machine learning model to generate a first output from a first ordered set of inputs, wherein the machine learning model comprises a plurality of layers organized in order such that (i) units of a first layer of the plurality of layers receive as inputs respective inputs of the first ordered set of inputs and provide respective intermediate outputs to a second layer of the plurality of layers, (ii) units of a middle layer of the plurality of layers receive as inputs intermediate outputs of a preceding layer of the plurality of layers and provide respective intermediate outputs to a subsequent layer of the plurality of layers, the middle layer comprising two adjacent units that provide outputs to a unit of the subsequent layer, and (iii) a final layer of the plurality of layers receives as inputs intermediate outputs of a preceding layer of the plurality of layers and provides as an output the output of the machine learning model, wherein executing the machine learning model to generate the first output from the first ordered set of inputs comprises storing at least one intermediate output of the first layer and at least one intermediate output of the middle layer;

obtaining a second ordered set of inputs by shifting the first ordered set of inputs such that a plurality of former inputs of the second ordered set of inputs are a plurality of latter inputs of the first ordered set of inputs, wherein a latter-most input of the second ordered set of inputs is a novel input; and executing the machine learning model to generate a second output from the second ordered set of inputs, wherein executing the machine learning model to generate the second output from the second ordered set of inputs comprises (i) re-using at least one of the stored intermediate outputs of the first layer instead of re-computing the at least one of the stored intermediate outputs of the first layer and (ii) re-using at least one of the stored intermediate outputs of the middle layer instead of re-computing the at least one of the stored intermediate outputs of the middle layer.

16. The system of claim 15, wherein only the latter-most input of the second ordered set of inputs is a novel input and the remainder of the inputs of the second ordered set of inputs are the latter-most inputs of the first ordered set of inputs, and wherein storing at least one intermediate outputs of the first layer and at least one intermediate output of the middle layer comprises storing the intermediate output of the latter-most unit of the first layer and the intermediate output of the latter-most unit of the middle layer.

17. The system of claim 15, wherein each unit of a given layer of the machine learning model other than the first layer receives inputs from a respective non-overlapping set of adjacent units of an immediately lower layer of the machine learning model, and wherein executing the machine learning model to generate the second output from the second ordered set of inputs comprises, for a given layer of the machine learning model other than the first layer, re-using at least one stored intermediate output from a set of two or more stored intermediate outputs for the given layer instead of re-computing the at least one stored intermediate output of the given layer.

18. The system of claim 17, wherein each unit of a given layer of the machine learning model other than the first layer receives inputs from a respective non-overlapping set of two adjacent units of an immediately lower layer of the machine learning model, and wherein the method further comprises storing, for an $n^{th}$ layer of the machine learning model, $2^{n-1}$ intermediate outputs.

19. The system of claim 15, wherein the method further comprises:

transmitting, from a first controller that comprises one or more processors of the at least one processor to a second controller that comprises one or more processors of the at least one processor, an indication of the first ordered set of inputs, wherein executing the machine learning model to generate the first output from the first ordered set of inputs is performed by the second controller, and wherein storing at least one intermediate output of the first layer and at least one intermediate output of the middle layer comprises storing the at least one intermediate output of the first layer and the at least one intermediate output of the middle layer in a memory of the second controller; and subsequently transmitting, from the first controller to the second controller, an indication of the novel input, wherein obtaining the second ordered set of inputs and executing the machine learning model to generate the second output from the second ordered set of inputs are performed by the second controller using the at least one intermediate output of the first layer and the at least one intermediate output of the middle layer stored in the memory of the second controller.

20. The system of claim 19, wherein the second controller comprises at least one of a graphics processing unit or a tensor processing unit.

* * * * *